United States Patent
Lacroix

(10) Patent No.: US 6,796,331 B1
(45) Date of Patent: Sep. 28, 2004

(54) DELIVERY VALVE DEVICE FOR A FLUID COMPRESSOR

(75) Inventor: Charles Lacroix, La Batie Montgascon (FR)

(73) Assignee: Tecumseh Europe S.A., La Verpilliere (FR)

( * ) Notice: Subject to any disclaimer, the term of this patent is extended or adjusted under 35 U.S.C. 154(b) by 165 days.

(21) Appl. No.: 10/111,318

(22) PCT Filed: Oct. 31, 2000

(86) PCT No.: PCT/FR00/03042

§ 371 (c)(1),
(2), (4) Date: Apr. 24, 2002

(87) PCT Pub. No.: WO01/33123

PCT Pub. Date: May 10, 2001

(30) Foreign Application Priority Data

Nov. 5, 1999 (FR) .............................. 99 13919

(51) Int. Cl.$^7$ .............................................. F16K 15/16
(52) U.S. Cl. .................... 137/857; 137/855; 417/569
(58) Field of Search ................. 137/855, 856, 137/857, 852, 859; 251/359; 417/569, 571

(56) References Cited

U.S. PATENT DOCUMENTS

| 1,682,908 | A | * | 9/1928 | Osgood | .................... 137/512.5 |
|---|---|---|---|---|---|
| 1,688,185 | A | | 10/1928 | Hazard | |
| 2,161,769 | A | * | 6/1939 | Trask | ........................... 137/857 |
| 4,628,963 | A | * | 12/1986 | Ishijima et al. | .............. 137/857 |
| 4,723,896 | A | * | 2/1988 | Fritchman | .................... 417/571 |
| 5,110,272 | A | * | 5/1992 | Peruzzi et al. | ............... 417/571 |
| 5,380,176 | A | * | 1/1995 | Kikuchi et al. | ............. 418/55.1 |
| 5,554,016 | A | * | 9/1996 | Sasano et al. | ............... 417/569 |
| 5,558,508 | A | * | 9/1996 | Sasano et al. | ............... 417/569 |
| 6,113,369 | A | * | 9/2000 | Selway | ........................ 417/569 |
| 6,314,990 | B1 | * | 11/2001 | Brabek et al. | ............ 137/454.4 |

FOREIGN PATENT DOCUMENTS

| DE | 16 50 444 | 8/1970 |
|---|---|---|
| DE | 195 04 267 A1 | 4/1996 |
| GB | 1 384 661 | 2/1975 |

* cited by examiner

*Primary Examiner*—Ramesh Krishnamurthy
(74) *Attorney, Agent, or Firm*—Oblon, Spivak, McClelland, Maier & Neustadt, P.C.

(57) ABSTRACT

A delivery valve device for a fluid compressor. The device includes a valve plate with a delivery passage closed by a delivery valve pressed against the valve plate by a spring. The valve plate includes an inset housing to accommodate the delivery valve and the spring, the housing having a shape tailored to the delivery valve and spring to hold the delivery valve and spring in position, and to prevent the delivery valve and spring from rotating. Such a delivery valve can be applied in particular to refrigerant compressors.

16 Claims, 3 Drawing Sheets

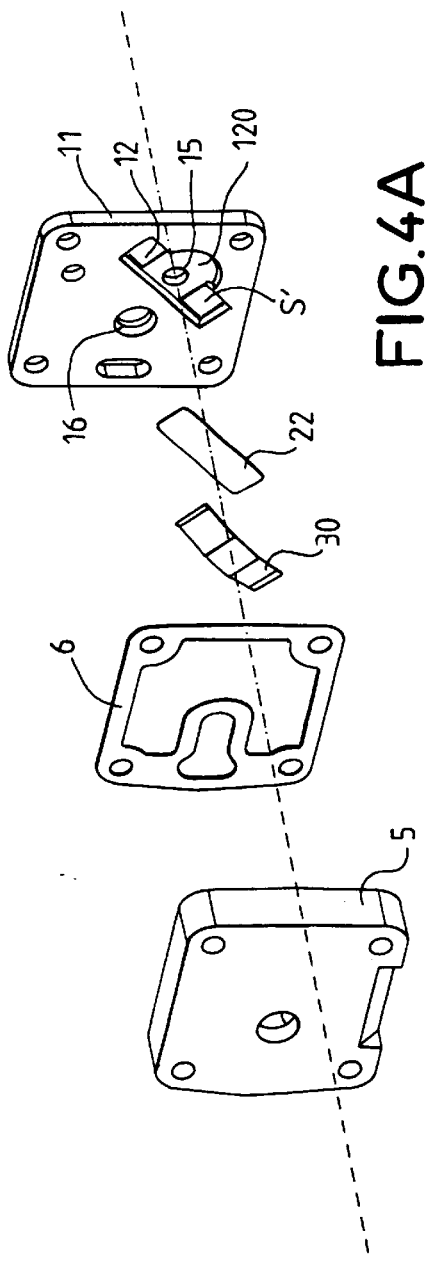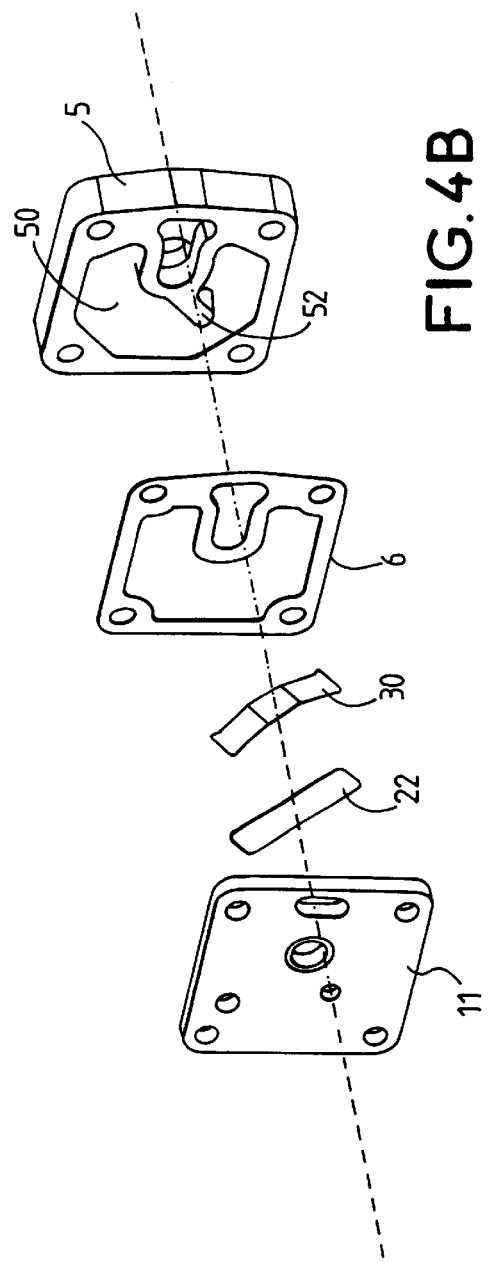

DELIVERY VALVE DEVICE FOR A FLUID COMPRESSOR

BACKGROUND OF THE INVENTION

1. Field of the Invention

The invention relates to a delivery valve device for a fluid compressor, particularly a refrigerant compressor.

2. Related Art

In known fluid compressors, a valve plate is provided to allow fluid in toward a compressor system proper (cylinder and piston) and to allow the compressed fluid to be delivered, this being through passages in the plate which are closed variously by inlet and delivery valves.

The delivery valve is a sensitive part of the system because, as a result of the differential pressures, it is subjected to high loadings and is one of the important factors in the level of noise generated by the compressor. What happens is that the opening and closure of the valves results, particularly in the case of the delivery valve, in bounce and flutter with metal-to-metal contact, generating noise. Furthermore, the known valve devices generally use a valve plate with a flat surface onto which the valve needs to be fixed without being able to rotate, and held in position by pins or rivets. Because of the drillings needed, the various parts are weakened. Furthermore, the cost of manufacturing and assembling them is greater.

The object of the invention is to remedy these various drawbacks by limiting the impacts due to the delivery valve and by simplifying its manufacture while at the same time increasing the-robustness of the assembly, by eliminating the fixing rivets or other pins.

BRIEF SUMMARY OF THE INVENTION

According to the invention, there is therefore provided a delivery valve device for a fluid compressor, particularly a refrigerant compressor, of the type comprising a valve plate, pierced with at least one fluid delivery passage, a delivery valve closing said passage on the downstream side in the direction in which the fluid is delivered, a spring keeping the delivery valve against the valve plate and a stop limiting the movements of the valve and applying stress to said spring, said device being characterized in that said delivery valve consists of a flat elastic leaf, in that said spring consists of a curved spring leaf pressing said valve against the valve plate at regions near the two ends of the valve, and in that said valve plate comprises an inset housing surrounding said delivery passage, for accommodating said valve and said spring and preventing them from rotating, said housing being of a shape tailored to the shapes of the valve and of the spring.

By virtue of this device, the delivery valve is kept constantly in contact with the valve plate on which it slides. In addition, no drillings are required for holding the various parts.

BRIEF DESCRIPTION OF THE DRAWINGS

The invention will be better understood and other features and advantages will become apparent through the description below of the appended drawings in which:

FIGS. 4A and 4B depict exploded perspective views of the device according to the invention of FIG. 3.

DETAILED DESCRIPTION OF THE INVENTION

Figure 1:
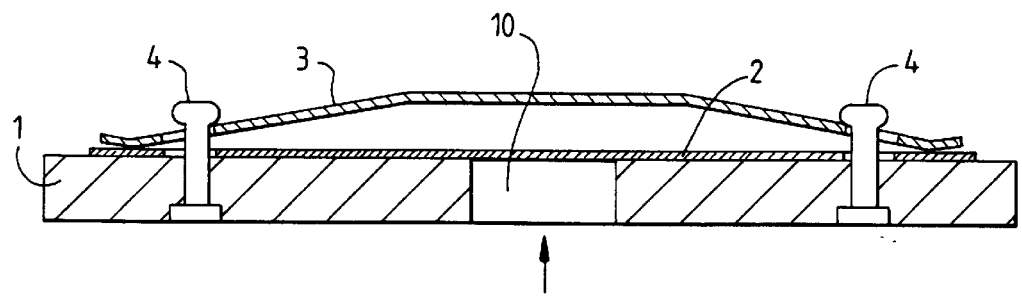
FIG. 1 is a diagram of a known delivery valve device.

FIG. 1 shows a simplified diagram of a known delivery valve device. Arranged on a valve plate 1 for conveying (in the direction of the arrow) a compressed fluid through a delivery passage 10, is a valve 2 which is pressed against the valve plate 1 by a spring 3. As the delivery valve opens, it deforms elastically under the pressure of the fluid and lifts off its seat around the passage 10. To keep the valve and the spring correctly positioned in spite of the opening and closing movements of the delivery valve, rivets or pins 4 passing through them are provided.

Figure 2:
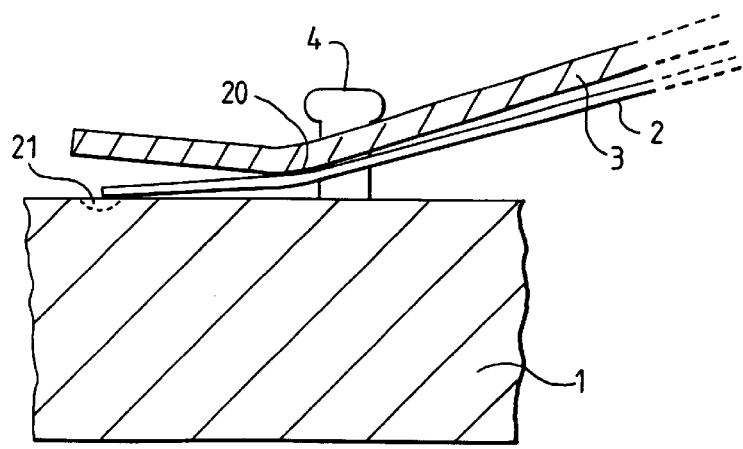
FIG. 2 illustrates certain disadvantages of the known valve of FIG. 1.

FIG. 2, which shows an enlarged detail of the device of FIG. 1, illustrates certain disadvantages of the device. This figure corresponds to the open position of the valve 2 where it is lifted against the action of the spring 3. It can be seen, firstly, that the end of the valve 2 presses against the valve plate 1 while at the same time sliding thereon, thus defining a large region of wear 21. Secondly, between the bearing region 20 of the spring 3 against the valve 2 and the end of the valve there is great deformation of the valve, hence significant prestress at the time of closure, which results in bounce, which is a source of noise and reduces the efficiency of the compressor. Furthermore, the drilling needed in the valve and in the spring in regions of maximum loading causes these parts to be weakened.

Figure 3:
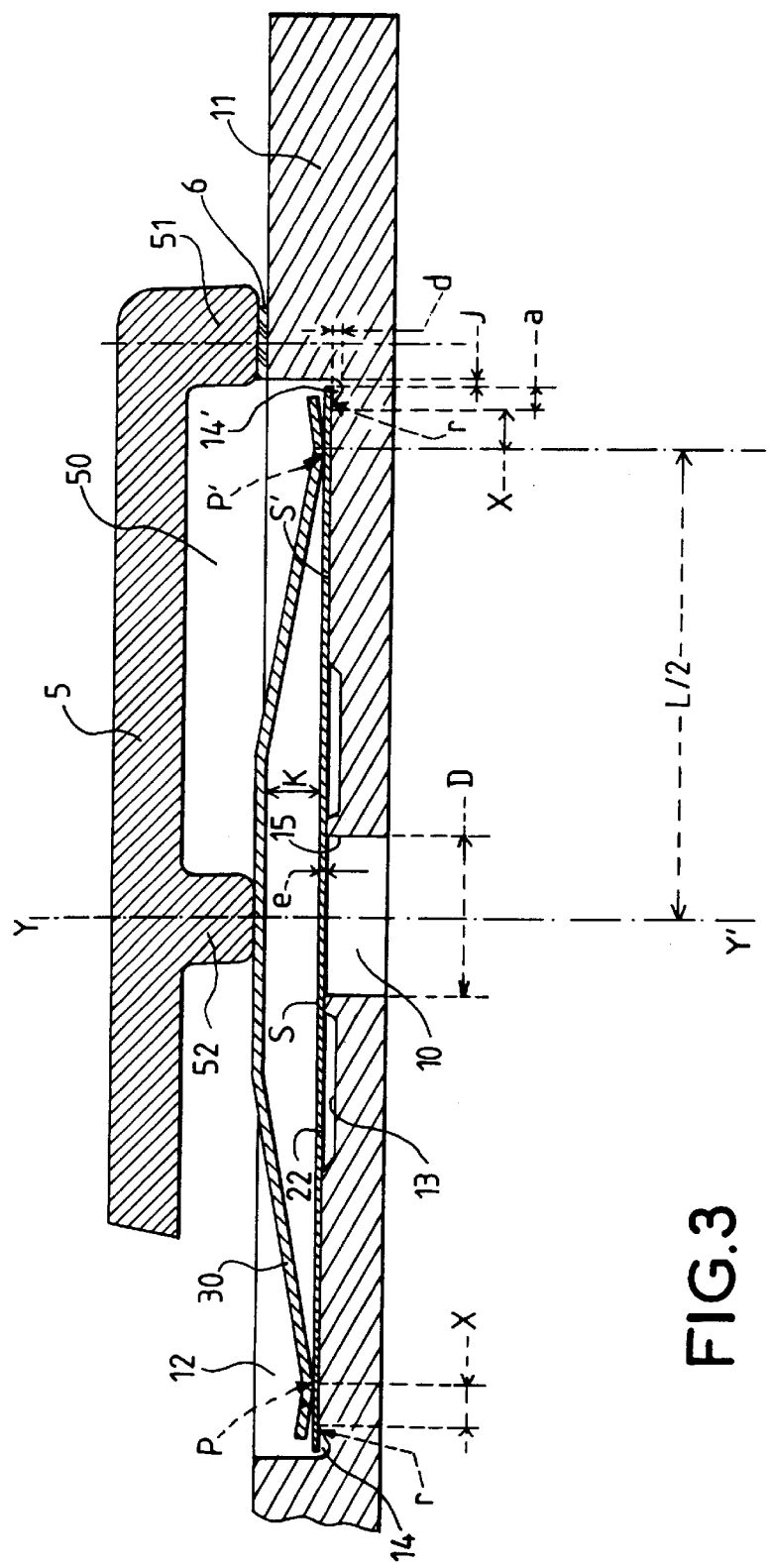
FIG. 3 depicts a section through a delivery valve device according to the invention.

FIG. 3 is a section through a delivery valve device according to the invention. Here again, we have a valve plate 11 with a delivery passage 10. This plate comprises an inset housing 12 surrounding the passage 10. Arranged in this housing 12 are a valve 22 formed of a flat elastic leaf and a spring consisting of a curved spring leaf 30 pressing against the valve at two regions P and P'. It is assumed here that rectangular leaves have been chosen for the valve and for the spring and the regions P and P' are then transverse lines of contact. The valve plate is assembled, via a seal 6, with a cylinder head 5 which delimits a delivery chamber 50. This cylinder head comprises, in the chamber 50, a protruding element 52 which acts as a stop and presses against the central part of the spring 30 to prestress it against the valve 22.

The housing 12 in the valve plate 11 has a shape tailored to the shapes of the valve and of the spring (in this instance rectangular) so as to hold these in position and prevent them from rotating. By virtue of this measure, any means of fixing or of guiding and any drillings can be omitted.

The bottom 13 of the housing 12 has certain features. It comprises, around the delivery passage 10, a raised plane S forming a seat 15 for the valve. Separated from this first plane, two raised flat regions forming a second plane S' are arranged on each side of the passage 10. These second planes S' are separated from the first plane and also from the walls of the housing 12. The level of the planes S' is slightly lower, by a value h, down than the plane S of the seat, for a reason which will be seen hereinbelow. At the two ends of the housing 12 corresponding to the ends of the delivery valve, the planes S' are separated from the wall of the housing by setbacks 14, 14' connected to these planes by rounded parts of radius of curvature r. The ends of the valve 22 are situated above these setbacks. The lines P, P' along which the spring bears on the valve are at a distance X away from the edge of the rounded part of the corresponding setback. In the closed position (as depicted in the figure), the delivery valve 22 is pressed against the valve plate 11 by the spring 30. Because of the difference in level h between the planes S and S', the valve is slightly curved, and this has a twofold advantage: firstly, it ensures sealing between the valve 22 and the seat 15, and secondly, it limits the region of contact of the valve with the planes S' to a linear region rather than to the entire surface, this greatly reducing the risk that the valve will stick to the valve plate 11.

As the valve 22 opens, its ends lying over the setbacks move freely without the risk of wearing away the surface of the valve plate. The valve is held by the spring 30 in sliding contact with the rounded edges of the planes S' along the setbacks 14, 14', and this allows the ends of the valve 22 to slide in permanent contact between the valve plate 11 and the spring 30. As the distance X between the linear contact P, P' between the spring and the valve and the linear contact between the valve and the edge of the plane S' is chosen to be sufficiently small, the deformations and prestress of the valve are reduced to a minimum and the friction generated by the bearing force against the valve plate makes it possible to appreciably damp the movements of the valve and therefore reduce flutter and improve the efficiency of the device. Among the other advantages of the device, it should be noted that the in-setting into the housing 12 makes it possible to reduce the distance between the seat 15 of the delivery valve and the underside of the valve plate 11, and therefore the "dead volume" due to the volume of the delivery passage.

Also, when, as is increasingly the case, the valve plate is a sintered metal casting, only the essential surfaces need to be machined, namely the seat S and the flat topside and underside of the valve plate.

Finally, the device according to the invention minimizes the number of parts used, and therefore the spread on performance and the cost.

FIGS. 4A and 4B depict, in exploded views, the device according to the invention viewed from two opposite sides. The same reference numerals denote the same elements as in FIG. 3. It can also be seen that the valve plate 11 comprises an intake or inlet passage 16 and that the housing 12 has a widened central part 120 allowing unslowed passage of the compressed fluid when the delivery valve is open.

By way of example of a practical embodiment, certain dimensions (in millimeters) of the device, which dimensions are shown in FIG. 3, are preferably given by the following relationships:

$$0.5 \text{ mm} < X < 1 \text{ mm}$$
$$\frac{D}{4} \leq K \leq \frac{D}{3}$$
$$174e < L < 180e$$
$$d \geq \frac{2Ka}{L}$$
$$\frac{1.5 \times 10^{-3}}{e} < h < \frac{7.5 \times 10^{-3}}{e}$$

where D is the diameter of the delivery passage, K is the maximum opening height of the delivery valve, e is the thickness of the valve and L is its length between the two regions P, P', a is the distance between one end of the valve and the start of the corresponding setback towards the support plane S', d is the depth of the setbacks 14, 14' and h is the difference in level of the planes S and S'.

The clearance J between the ends of the valve 22 and the walls facing them belonging to the housing 12 may be of the order of one tenth of a millimeter.

Of course, the exemplary embodiments described do not in any way restrict the invention. In particular, the compressed fluid may be a refrigerant or any gas such as air and the compressors capable of using the delivery valve device according to the invention may be of any type (air, air-conditioning or refrigerating, rotary or reciprocating compressors, etc.).

What is claimed is:

1. A delivery valve device for a fluid compressor, comprising:
   a valve plate, pierced with at least one fluid delivery passage;
   a delivery valve closing said fluid delivery passage on a downstream side in a direction in which fluid is delivered;
   a spring configured to bias the delivery valve against the valve plate; and
   a stop configured to limit movements of the delivery valve and to apply stress to said spring, said delivery valve including a flat elastic leaf and said spring including a curved spring leaf pressing the delivery valve against the valve plate at a first and a second end of the delivery valve, said at least one fluid delivery passage being positioned substantially symmetrically between said first and second ends of the delivery valve along both a lengthwise and widthwise direction of said valve;
   wherein said spring leaf presses said delivery valve onto the valve plate at regions close to but distinct from the two ends of the delivery valve, wherein said spring leaf and said delivery valve are configured so that when the delivery valve opens, the spring leaf keeps the delivery valve, near its two ends, in permanent sliding contact with the valve plate; and
   wherein said valve plate comprises an inset housing surrounding said fluid delivery passage, configured to accommodate said delivery valve and said spring and to prevent said delivery valve and said spring from rotating, said housing being of a shape tailored to shapes of said delivery valve and of said spring.

2. The device as claimed in claim 1, wherein said delivery valve, said spring leaf, and said housing in the valve plate have a roughly rectangular shape.

3. A delivery valve device for a fluid compressor, comprising:
   a valve plate, pierced with at least one fluid delivery passage:
   a delivery valve closing said fluid delivery passage on a downstream side in a direction in which fluid is delivered:
   a spring configured to bias the delivery valve against the valve plate; and
   a stop configured to limit movements of the delivery valve and to apply stress to said spring, said delivery valve including a flat elastic leaf and said spring including a curved spring leaf pressing said delivery valve against the valve plate at two ends of said delivery valve;
   wherein said spring leaf presses said delivery valve onto the valve plate at regions close to but distinct from the two ends of the delivery valve, wherein said spring leaf and said delivery valve are configured so that when the delivery valve opens, the spring leaf keeps the delivery valve, near its two ends, in permanent sliding contact with the valve plate;
   wherein said valve plate comprises an inset housing surrounding said fluid delivery passage, configured to accommodate said delivery valve and said spring and to prevent said delivery valve and said spring from rotating, said housing being of a shape tailored to shapes of said delivery valve and of said spring; and wherein a bottom of the housing of the valve plate comprises a first raised plane surrounding the fluid delivery passage and forming a seat of the delivery valve, and second raised planes on each side of the fluid delivery passage, acting as supports for said delivery valve in a closed position, said second planes being separated from the first plane and from edges of the housing and being situated at a level that is lower than the first plane.

4. The device as claimed in claim 3, wherein said delivery valve, said spring leaf, and said housing in the valve plate have a roughly rectangular shape.

5. The device as claimed in claim 3, further comprising a cylinder head which, by pressing against the valve plate, is configured to close a delivery chamber and comprises, inside the delivery chamber, a protruding element acting as a stop and pressing against a central part of said spring leaf.

6. The device as claimed in claim 5, wherein said delivery valve, said spring leaf, and said housing in the valve plate have a roughly rectangular shape.

7. A delivery valve device for a fluid compressor, comprising:
    a valve plate, pierced with at least one fluid delivery passage:
    a delivery valve closing said fluid delivery passage on a downstream side in a direction in which fluid is delivered;
    a spring configured to bias the delivery valve against the valve plate; and
    a stop configured to limit movements of the delivery valve and to apply stress to said spring, said delivery valve including a flat elastic leaf and said spring including a curved spring leaf pressing said delivery valve against the valve plate at two ends of said delivery valve;
    wherein said spring leaf presses said delivery valve onto the valve plate at regions close to but distinct from the two ends of the delivery valve, wherein said spring leaf and said delivery valve are configured so that when the delivery valve opens, the spring leaf keeps the delivery valve, near its two ends, in permanent sliding contact with the valve plate;
    wherein said valve plate comprises an inset housing surrounding said fluid delivery passage, configured to accommodate said delivery valve and said spring and to prevent said delivery valve and said spring from rotating, said housing being of a shape tailored to shapes of said delivery valve and of said spring;
    wherein a bottom of the housing of the valve plate comprises a first raised plane surrounding the fluid delivery passage and forming a seat of the delivery valve, and second raised planes on each side of the fluid delivery passage, acting as supports for said delivery valve in a closed position, said second planes being separated from the first plane and from edges of the housing and being situated at a level that is lower than the first plane; and
    wherein said second support planes are separated from the edges of the housing by setbacks, connected to the second planes by rounded parts, said setbacks freely allowing the two ends of the delivery valve to move as the delivery valve opens.

8. The device as claimed in claim 7, further comprising a cylinder head which, by pressing against the valve plate, is configured to close a delivery chamber and comprises, inside the delivery chamber, a protruding element acting as a stop and pressing against a central part of said spring leaf.

9. The device as claimed in claim 8, wherein said delivery valve, said spring leaf, and said housing in the valve plate have a roughly rectangular shape.

10. The device as claimed in claim 8, wherein dimensions, in millimeters, of elements of said device are determined from relationships:

$$\frac{D}{4} \leq K \leq \frac{D}{3}$$
$$174e < L \leq 180e$$
$$d \geq \frac{2Ka}{L}$$
$$\frac{1.5 \times 10^{-3}}{e} < h < \frac{7.5 \times 10^{-3}}{e}$$

where D is a diameter of the fluid delivery passage, K is a maximum opening height of the delivery valve, e is a thickness of the delivery valve, L is a length between two regions where the spring presses on the delivery valve and a is a distance between one end of the delivery valve and a start of the corresponding setback on said support plane.

11. The device as claimed in claims 9, wherein dimensions, in millimeters, of elements of said device are determined from relationships:

$$\frac{D}{4} \leq K \leq \frac{D}{3}$$
$$174e < L \leq 180e$$
$$d \geq \frac{2Ka}{L}$$
$$\frac{1.5 \times 10^{-3}}{e} < h < \frac{7.5 \times 10^{-3}}{e}$$

where D is a diameter of the fluid delivery passage, K is a maximum opening height of the delivery valve, e is a thickness of the delivery valve, L is a length between the two regions where the spring presses on the delivery valve and a is a distance between one end of the delivery valve, and a start of the corresponding setback on said support plane.

12. The device as claimed in claim 7, wherein dimensions, in millimeters, of elements of said device are determined from relationships:

$$\frac{D}{4} \leq K \leq \frac{D}{3}$$
$$174e < L \leq 180e$$
$$d \geq \frac{2Ka}{L}$$
$$\frac{1.5 \times 10^{-3}}{e} < h < \frac{7.5 \times 10^{-3}}{e}$$

where D is a diameter of the fluid delivery passage, K is a maximum opening height of the delivery valve, e is a thickness of the delivery valve, L is a length between two regions where the spring presses on the delivery valve, and a is a distance between one end of the delivery valve and a start of the corresponding setback on said support plane.

13. The device as claimed in claim 7, wherein said delivery valve, said spring leaf, and said housing in the valve plate have a roughly rectangular shape.

14. The device as claimed in claim 13, wherein dimensions, in millimeters, of elements of said device are determined from relationships:

$$\frac{D}{4} \leq K \leq \frac{D}{3}$$

$$174e < L \leq 180e$$

$$d \geq \frac{2Ka}{L}$$

$$\frac{1.5 \times 10^{-3}}{e} < h < \frac{7.5 \times 10^{-3}}{e}$$

where D is a diameter of the fluid delivery passage, K is a maximum opening height of the delivery valve, e is a thickness of the delivery valve, L is a length between the two regions where the spring presses on the delivery valve, and a is a distance between one end of the delivery valve and a start of the corresponding setback on said support plane.

15. A delivery valve device for a fluid compressor, comprising:

a valve plate, pierced with at least one fluid delivery passage;

a delivery valve closing said fluid delivery passage on a downstream side in a direction in which fluid is delivered;

a spring configured to bias the delivery valve against the valve plate;

a stop configured to limit movements of the delivery valve and to apply stress to said spring, said delivery valve including a flat elastic leaf and said spring including a curved spring leaf pressing said delivery valve against the valve plate at two ends of said delivery valve; and a cylinder head which, by pressing against the valve plate, is configured to close a delivery chamber and comprises, inside the delivery chamber, a protruding element acting as a stop and pressing against a central part of said spring leaf;

wherein said spring leaf presses said delivery valve onto the valve plate at regions close to but distinct from the two ends of the delivery valve, wherein said spring leaf and said delivery valve are configured so that when the delivery valve opens, the spring leaf keeps the delivery valve, near its two ends, in permanent sliding contact with the valve plate; and wherein said valve plate comprises an inset housing surrounding said fluid delivery passage, configured to accommodate said delivery valve and said spring and to prevent said delivery valve and said spring from rotating, said housing being of a shape tailored to shapes of said delivery valve and of said spring.

16. The device as claimed in claim 15, wherein said delivery valve, said spring leaf, and said housing in the valve plate have a roughly rectangular shape.

* * * * *